United States Patent

DiRocco

[15] 3,696,403

[45] Oct. 3, 1972

[54] LOW LEVEL CONVERSION SYSTEM

[72] Inventor: James V. DiRocco, Winchester, Mass.

[73] Assignee: Gordon Engineering Company, Wakefield, Mass.

[22] Filed: Nov. 25, 1970

[21] Appl. No.: 92,653

[52] U.S. Cl.............................340/347 NT, 324/99 D

[51] Int. Cl.............................................H03k 13/00

[58] Field of Search...340/347 NT, 347 CC, 347 AD; 324/99 R, 99 A

[56] References Cited

UNITED STATES PATENTS

| | | | |
|---|---|---|---|
| 3,296,613 | 1/1967 | Andersen et al. | ...340/347 NT |
| 3,480,949 | 11/1969 | Charbonnier et al. | ...340/347 NT |
| 2,941,196 | 6/1960 | Raynsford et al. | ..340/347 NT |
| 3,569,957 | 3/1971 | Masterson | ...........340/347 NT |
| 3,566,397 | 2/1971 | Walton | ................340/347 NT |

*Primary Examiner*—Thomas A. Robinson
*Attorney*—Morse, Altman & Oates

[57] ABSTRACT

Multiplexed analog signals are applied to the input of a sampling amplifier having a digitally controlled gain. The signals at the output of the sampling amplifier are applied to an analog to digital integrating converter. A phase lock oscillator is connected to a clock which controls the operation of the converter in such a manner that the integration time of the converter is equal to one or more cycles of the power line frequency, whereby maximum common mode rejection occurs at the power line frequency.

11 Claims, 2 Drawing Figures

INVENTOR.
JAMES V. DiROCCO
BY
Morse, Altman & Oates
ATTORNEY

LOW LEVEL CONVERSION SYSTEM

BACKGROUND OF THE INVENTION

1. Field of the Invention

This invention relates to conversion systems and more particularly to low level floating analog to digital conversion systems.

2. Description of the Prior Art

Various types of systems have been proposed for the amplification and conversion of low level analog signals. In the amplification and conversion of low level analog signals. In the amplification of low level signals, the problem of rejecting unwanted or stray signals arises, particularly common mode signals which represent errors at the output of the converter. Systems which provide high common move rejection ratios at all frequencies are unduly complex, slow acting and expensive.

SUMMARY OF THE INVENTION

It is an object of the present invention to provide a low level conversion system having high rejection ratios to common mode signal sources which is characterized by a low level multiplexer, a sampling amplifier, an analog to digital integrating converter, a clock-control, and a phase lock oscillator. A guard, maintained at the common mode voltage of a selected channel of the multiplexer, is provided about the amplifier and converter. Each channel of the multiplexer controls a shield and two signal lines, the shield and two signal lines being switched to the guard and input of the sampling amplifier, respectively. The signals at the output of the sampling amplifier, the gain of which is digitally controlled, are applied to the converter. The clock-control governs the operation of the converter and generates digital output signals. The phase lock oscillator inputs the clock-control for ensuring that maximum rejection occurs at power line frequency despite frequency shifts by making the integration time equal to one or more cycles of the power line frequency. The combination of multiplexer, sampling amplifier, converter, clock-control, and phase lock oscillator is such as to provide an expeditious and inexpensive low level conversion system.

The invention accordingly comprises the system possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENT

Figure 1:
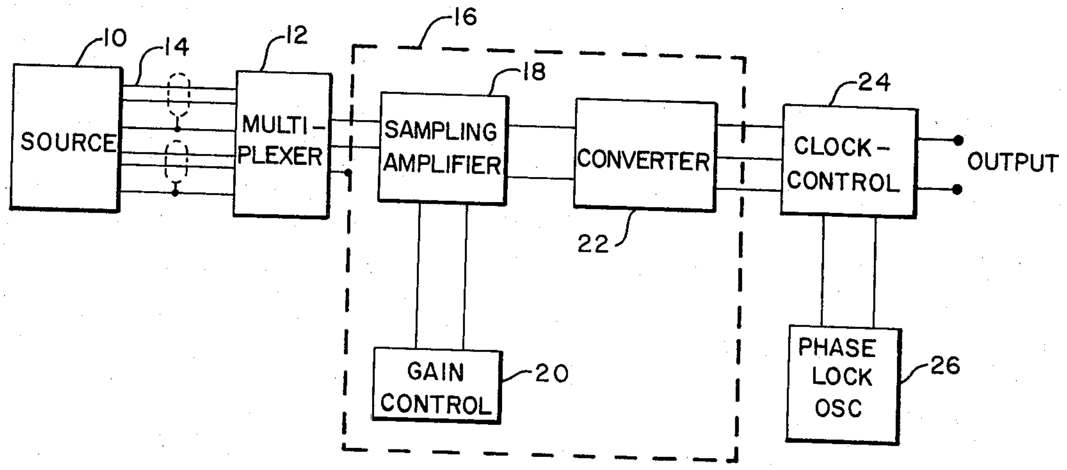
FIG. 1 is a block diagram of a system embodying the invention.

In the low level floating conversion system bipolar, in Fig. 1, signals from a source 10 are applied to a multichannel multiplexer 12 via shielded cables 14. For each channel of the multiplexer 12, a shield and two signal lines are switched to a guard 16 and the input of a sampling amplifier 18, respectively. The signals as at the output of sampling amplifier 18, the gain of which is controlled by a digital gain control 20, are applied to an analog to digital integrating converter 22 for conversion. In the preferred embodiment, converter 22 is a bipola, dual slope integrating converter which is characterized by voltage to count conversion. The signals for controlling the operation of converter 22, i.e., integration and conversion times, are generated by a clock-control 24. In order to ensure maximum rejection to common mode signals particularly at power line frequency, despite frequency shifts, clock-control 24 is controlled logically by signals generated by a phase lock oscillator 26 in such a manner that the integration time of converter 22 is equal to one or more cycles of the power line frequency. In consequence, errors which would have been introduced by common mode signals are canceled out. In the specific embodiment illustrated herein, by way of example, the conversion system is floating by means of transformer coupling. It is to be understood that, in alternative embodiments, the system is not floating or is floating by means other than a transformer coupling, for example photo-optical coupling. The detailed circuitry of the low level conversion system is shown in Fig. 2.

Figure 2:
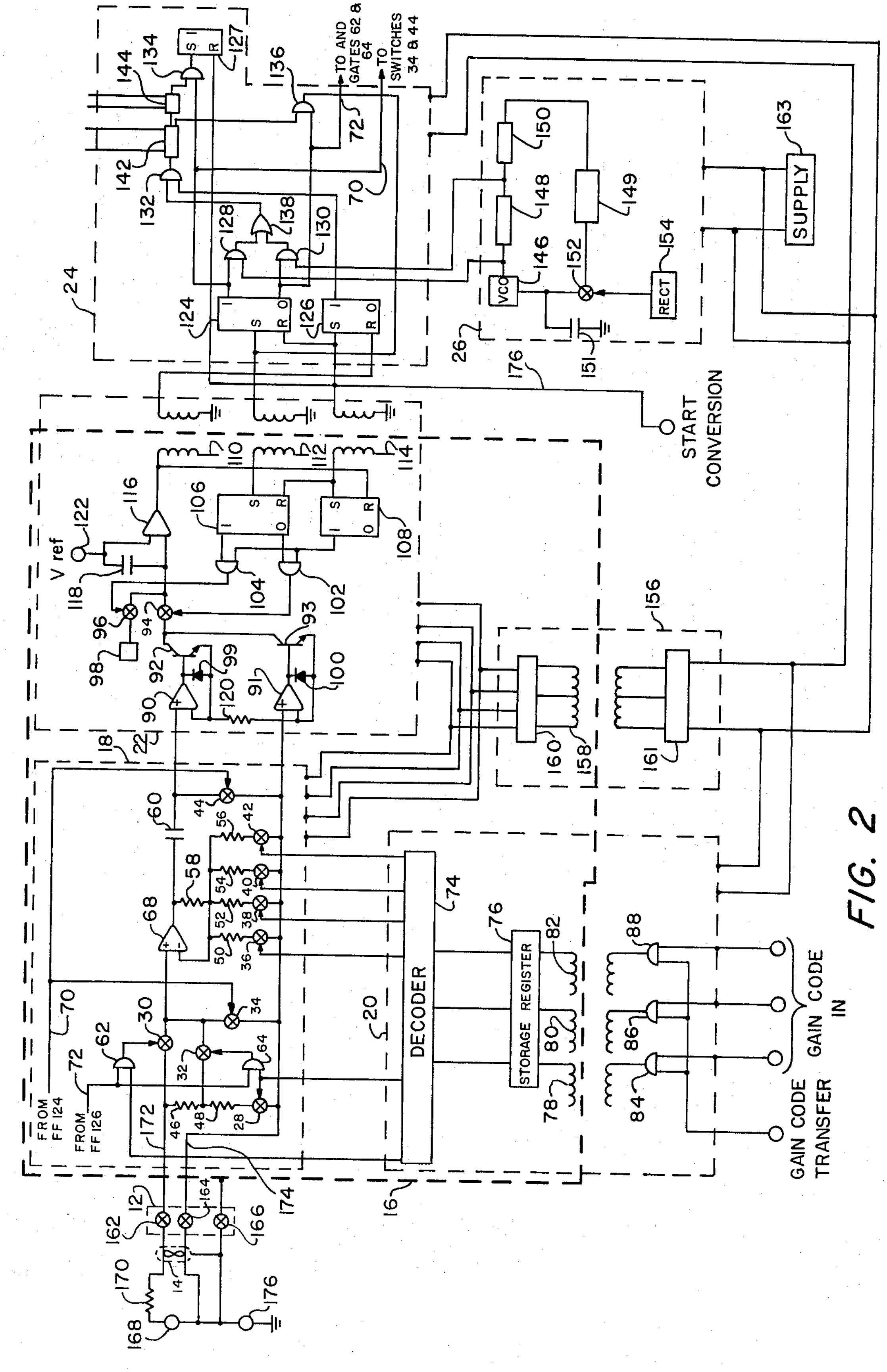
FIG. 2 is a schematic diagram of the system of Fig. 1.

As shown in Fig. 2, sampling amplifier 18 includes a plurality of switches 28, 30, 32, 34, 36, 38, 40, 42, and 44; resistors 46, 48, 50, 52, 54, 56, and 58; a capacitor 60; AND gates 62 and 64; and an operational amplifier 68. One side of each of switches 30, 32, and 34 is connected to the non-inverting input of amplifier 68. The other side of switch 30 is connected to the high side of a signal line 172. The other side of switch 32 is connected to signal line through resistor 46. The other side of switch 32 is connected also to one side of switch 28 through resistor 48, the other side of switch 28 being connected directly to the other side of switch 34, which is connected to the low side of a common line 174. The output of AND gate 62 is connected to the control terminal of switch 30, AND gate 62 receiving inputs from gain control 20 and clock-control 24. The output Of AND gate 64 is connected to the control terminal of switch 32, AND gate 64 receiving inputs from gain control 20 and clock-control 24. The control terminal of each of the switches 34 and 44 is connected to clock-control 24 via a line 70. The signal from clock-control 24 which is applied to AND gates 62 and 64 via a line 72 is the complement of the signal applied to switches 34 and 44 via line 70. That is, when the signal on line 70 is ONE, the signal on line 72 is ZERO and when the signal on line 70 is ZERo, the signal on line 72 is ONE. One side of each of switches 36, 38, 40, 42, and 44 is connected directly to the common side of switches 28, and 34. The other side of switch 44 is connected to the output of amplifier 68 through capacitor 60. The other side of each of switches 36, 38, 40, and 42 is connected to the inverting input of amplifier 68 via resistors 50, 52, 54, and 56, respectively. The output of amplifier 68 is connected also to the junction of resistors 50, 52, 54, and 56 through a resistor 58. The combination of resistor 58 and active resistors 50, 52, 54, and 56 serves as a voltage divider network which determines the gain of amplifier 68. Each of resistors 50, 52, 54, and 56 is considered active when its correlative switch is energized by the signals from gain control 20.

Gain control 20 includes a decoder 74; a storage register 76; transformers 78, 80, and 82; and AND gates 84, 86, and 88. The output of each of AND gates 84, 86, and 88 is connected to storage register 76 via transformers 78, 80, and 82, respectively. Decoder 74, which is inputed by the signals from storage register 76, is connected to AND gates 62 and 64, and the control terminals of switches 28, 36, 38, 40, and 42 for digitally controlling the gain of sampling amplifier 18. Each of AND gates 84, 86, and 88 is inputed by "gain code in" and "gain code transfer" signals from a control (not shown).

Converter 22 includes operational amplifiers 90 and 91; transistors 92 and 93; switches 94 and 96; a reference current source 98; diodes 99 and 100; AND gates 102 and 104; flip-flops 106 and 108; transformers 110, 112, and 114; a comparator 116; a capacitor 118; and a resistor 120. The output of amplifier 90 is connected to the cathode of diode 99 and the base of transistor 92. The emitter of transistor 92 is connected to the junction of the anode of diode 99, the inverting input of amplifier 90, and one side of resistor 120. The output of amplifier 91 is connected to the cathode of diode 100 and the base of transistor 93. The emitter of transistor 93 is connected to the junction of the anode of diode 100, the inverting input of amplifier 91, and the other side of resistor 120. The collector of transistor 93 is connected to the junction of the collector of transistor 92 and one side of switch 94. The other side of switch 94 is connected to one input of comparator 116, one side of capacitor 118, and one side of switch 96. The other side of switch 96 is connected to reference current source 98. The other side of capacitor 118 is connected to another input of comparator 116, a reference voltage 122 being applied at the junction of capacitor 118 and the input of comparator 116. The output of each of AND gates 102 and 104 is connected to the control terminals of switches 94 and 96, respectively. One input of each of AND gates 102, and 104 is connected to the "1" terminal of flip-flop 108. The other input of each of AND gates 102 and 104 is connected to the "0" and " 1" terminals, respectively, of flip-flop 106. The set terminal of flip-flop 106 is connected to transformer 112. The set terminal of flip-flop 108 is connected to transformer 114 and the reset terminal of flip-flop 106. The output of comparator 116 is connected to the reset terminal of flip-flop 108 and transformer 110. Each of transformers 110, 112, and 114 is connected to input terminals of clock-control 24.

Clock-control 24 is comprised of flip-flop, 124, 126 and 127; AND gates 128, 130, 132, 134, and 136; OR gate 138; and counters 142 and 144. The set terminals of flip-flops 124 and 126 are connected to transformers 112 and 114, respectively. The reset terminals of flip-flops 124 and 126 are connected to the set terminal of flip-flop 126 and transformer 110, respectively. One input of each of AND gates 128 and 130 is connected to the "1" and "0" terminals, respectively, of flip-flop 124; the other input of each of the AND gates is connected to phase lock oscillator 26. The output of AND gate 128 is connected to one input of OR gate 138 and the output of AND gate 130 is connected to the other input of OR gate 138. The output of OR gate 138 is connected to one input of AND gate 132 and the other input of AND gate 132 is connected to the "1" terminal of flip-flop 126. The output of AND gate 132 is connected to the input of counter 142, and the output of counter 142 is connected to the input of counter 144. The "0" terminal of flip-flop 124 is connected also to one input of AND gate 136. The other input of AND gate 136 is connected to the output of counter 142. The output of AND gate 136 is connected to the set terminal of flip-flop 124. One input of AND gate 134 is connected to the output of counter 144 and the other input of AND gate 134 is connected to the "1" terminal of flip-flop 124. The output of AND gate 134 is connected to the set terminal of flip-flop 127. The reset terminal of flip-flop 127 is connected to the set terminal of flip-flop 126. The "0" terminal of flip-flop 124 is connected to the input of AND gates 62 and 64 via line 72. The "1" terminal of flip-flop 124 is connected to the control terminals of switches 34 and 44 via line 70.

Phase lock oscillator 26 is comprised of a voltage controlled oscillator 146; dividers 148 and 150; a ramp generator 149, a sample and hold including a capacitor 151 and a switch 152; and a full wave rectifier 154. The output of full wave rectifier 154 is connected to the control terminal of switch 152. One side of switch 152 is connected to the input of voltage controlled oscillator 146 and the other side of switch 152 is connected to ramp generator 149. Ramp generator 149 is controlled by the signal at the output of rectifier 154, for example rectified $60H_z$, and the signal at the output of divider 150. The output of voltage controlled oscillator 146 is connected to the input of divider 148 and the output of divider 148 is connected to the input of divider 150. The output of voltage controlled oscillator 146 is connected also to the other input of AND gate 128 and the output of divider 148 is connected also to the other input of AND gate 130.

Power is supplied to amplifier 18, gain control 20, and converter 22 from a power supply 156. Power supply 156 includes a transformer 158, and regulators 160 and 161. The floating secondary of transformer 158 is connected to sampling amplifier 18 and converter 22 via regulator 160. Voltage from a source 163, for example +5v, is applied to the primary of transformer 158 via regulator 161, as well as to gain control 20, phase lock oscillator 26, and clock-control 24.

By way of example, there is shown in Fig. 2 one channel of multiplexer 12, which includes switches 162, 164, and 166. One side of switch 162 is connected to a signal source 168 via shielded cable 14 and a resistor 170, the other side of switch 162 is connected to the junction of resistor 46 and one side of switch 30 via signal line 172. One side of switch 164 is connected directly to source 168 via shielded cable 14 and the other side of switch 164 is connected directly to the common side of switches 28, 34, 36, 38, 40, 42, and 44 via common line 174. One side of switch 166 is connected to a source 176 which represents the common mode signal, and the shielded lead of cable 14, the other side of switch 166 is connected to guard 16. It is to be understood that each channel of multiplexer 12 includes devices for switching two signal lines to the input of sampling amplifier 18 and a device for switching the shield lead to guard 16.

As shown in Fig. 2, the signal on line 172 either is applied directly to the non-inverting input of operational amplifier 68 via switch 30 or is applied to the non-inverting input of operational amplifier 68 via switch 32 and the voltage divider network of resistors 46 and 48. Switches 30 and 32 are controlled by the signal at the output of AND gate 62, 64, respectively.

In operation of the system, by way of example, a start conversion pulse is applied directly to the set terminal of flip-flop 126 and the reset terminals of flip-flops 124 and 127, and is applied through transformer 114 to the set terminal of flip-flop 108 and the reset terminal of flip-flop 106. In consequence, flip-flops 126 and 108 are set and flip-flops 124, 127, and 106 are reset.

As will be apparent hereinafter, flip-flop 124 is in a set condition at the completion of a conversion cycle. That is, prior to initiation of the start conversion pulse, a ONE is applied to switches 34 and 44 via line 70, whereby switches 34 and 44 are energized and capacitor 60 is charged to the offset voltage of operational amplifier 68. When flip-flop 124 is reset by the start conversion pulse, switches 34 and 44 are de-energized and AND gates 62 and 64 are enabled by a ONE, applied thereto via line 72, as at the "0" terminal of flip-flop 124. The signal applied to the other input of each of AND gates 62 and 64 from decoder 74 determines whether the signal at the output of the AND gates is ONE or ZERO. If the signal at the other input of AND gate 62 is ONE, switch 30 is energized. If the signal at the other input of AND gate 64 is ONE, switch 32 is energized.

In any event, the signal on line 172 is applied to the non-inverting input of amplifier 68 either via switch 30 or switch 32. As previously stated, the gain of amplifier 68 is digitally controlled by selectively energizing switches 36, 38, 40, and 42. The signal at the junction of capacitor 60 and switch 44 is applied to the non-inverting input of amplifier 90. It is to be noted that, in consequence of capacitor 60 being previously charged to the offset voltage of amplifier 68, the signal as at the junction of capacitor 60 and switch 44 is free of offset voltage of amplifier 68.

As previously stated, during this portion of the conversion cycle, flip-flop 108 is set and flip-flop 106 is reset. Consequently, AND gate 102 is enabled and switch 94 is energized. If the signal on line 172 is positive with respect to the signal on line 174, a positive voltage is applied to the base of transistor 92. If the signal on line 174 is positive with respect to the signal on line 172, a positive voltage is applied to the base of transistor 93. In any event, capacitor 118 which is charged to reference voltage 122 is discharged. The path through which capacitor 118 is discharged is specified by the conduction states of transistors 92 and 93. That is, when a positive voltage is applied to the base of transistor 92, the discharge path is defined by switch 94, transistor 92, resistor 120, and diode 100; and when a positive voltage is applied to the base of transistor 93, the discharge path is defined by switch 94, transistor 93, resistor 120, and diode 99. Capacitor 118 is discharged until flip-flop 106 is set by a ONE at the output of AND gate 136.

By way of example, in order to facilitate an understanding of the operation of clock-control 24 in governing the conversion time, numerical values will be assigned for the power line frequency, dividers 148, 150 and counters 142, 144. The power line frequency is $60H_z$, divider 148 is a 16 and divider 150 is a 512. A ONE is applied to AND 136 when counter 142 has counted 1,024 pulses and a ONE is applied to AND gate 134 when counter 144 has counted 4,096 pulses. As previously stated, in order to ensure maximum rejection to common mode signals, the integration time is made equal to one or more cycles of the power line frequency. In this example, the integration time is equal to one cycle of the power line frequency, the signal as at the output of divider 148 being $61.4KH_z$ (1,024 counts x $61.4KH_z$).

As previously indicated, flip-flop 124 is reset by the start conversion pulse, whereby a ONE is applied to one of the inputs of each of AND gates 130 and 136 from the "0" terminal of flip-flop 124. The $61.4KH_z$ signal as at the output of divider 148 is applied to counter 142 via enabled AND gate 130, OR gate 138, and AND gate 132. The ONE at the "1" terminal of flip-flop 126 and the ONE at the output of OR gate 138 enable AND gate 132. When counter 142 counts to 1024, a ONE is applied to the input of AND gate 136, the other input of AND gate 136 receiving a ONE from the "0" terminal of flip-flop 124, in consequence flip-flops 106 and 124 set by the ONE at the output of AND gate 136.

When flip-flops 106 and 124 set by the ONE at the output of AND gate 136.

When flip-flop 106 is set, AND gate 102 is disabled and AND gate 104 is enabled, in consequence switch 94 is de-energized and switch 96 is energized. The reference current from source 98 is applied to capacitor 118 through energized switch 96, whereby capacitor 118 is charged.

When flip-flop 124 is set, AND gate 128 is enabled and AND gate 130 is disabled. The signal at the output of voltage control oscillator 146 is applied to AND gate 128. Since the signal at the output of divider 148 is 61.4KHz, the signal at the output of voltage control oscillator is 983KHz. It will be appreciated that, by using the higher frequency at this time of the conversion cycle, the total conversion time is minimized. The 983 KHz signal is applied to counter 142 via AND gate 128, OR gate 138, and AND gate 132. The ONE at the "1" terminal of flip-flop 126 and the ONE at the output of OR gate 138 enable AND gate 132.

When capacitor 118 is charged to reference voltage 122, the signal as at the output of comparator 116 is ONE, whereby flip-flop 126 is reset and AND gate 132 is disabled. In consequence counters 142 and 144 stop counting. The count registered in counters 142 and 144 during the charging of capacitor 118 is a digital representation of the analog signal from source 168. If counter 144 counts beyond its capability, a ONE is applied to AND gate, whereby flip-flop 127 is set and an over-flow signal is presented at the "1" terminal thereof.

It will be readily appreciated, in an alternate embodiment, the conversion system includes a plurality of converters and multiplexers. In such a system, the outputs of each converter are digitally multiplexed using one phase lock oscillator and one power source having common primaries and multiple secondaries.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A low level analog to digital conversion system powered by an alternating current, said system comprising:

a. sampling amplifier means, an analog signal applied to an input of said sampling amplifier means;

b. integrating converter means electrically connected to said sampling amplifier means for converting the analog signal at an output of said sampling amplifier means to a digital signal; and c. means electrically connected to said converter means for controlling the conversion time of said converter means, the integration time of said converter means being at least one cycle of the power line frequency;

d. said means for controlling including:

i. clock-control means electrically connected to said integrating converter means; and ii. phase lock oscillator means electrically connected to said clock-control means, said clock-control means governing the operation of said integrating converter means, said phase lock oscillator means controlling said clock-control means;

e. said integrating converter means being a bipolar, dual slope integrating converter which includes:

i. input means electrically connected to said sampling amplifier means;

ii. current source means for providing a reference current;

iii. voltage means for providing a reference voltage;

iv. first switch means electrically connected to said clock-control means, said first switch means controlled by said clock-control means;

v. second switch means electrically connected to said clock-control means, said second switch means controlled by said clock-control means;

vi. integrator means operatively connected to said current source means through said first switch means and operatively connected to said input means through said second switch means; and vii. comparator means having at least two inputs, one of said inputs connected to said voltage source, the other of said inputs connected to said integrator, first switch, and second switch means;

viii. said integrator means charged to said reference voltage, said integrator means discharged through said second switch means and input means, said integrator means charged by said reference current through said first switch, said first and second switches having mutually exclusive states.

2. The system as claimed in claim 1, wherein said sampling amplifier and integrating converter means are floating.

3. The system as claimed in claim 2, said system including multiplexer means electrically connected to the input of said sampling amplifier means, said analog signal applied selectively to the input of said sampling amplifier means.

4. The system as claimed in claim 3 wherein said system includes:

a. guard means positioned about said sampling amplifier and integrating converter means; and b. shielded cable means electrically connecting said multiplexer and sampling amplifier means, said analog signal applied selectively to the input of said sampling amplifier means via the lines of said shielded cable, the shield of said shielded cable connected to said guard means.

5. The system as claimed in claim 1, wherein said phase lock oscillator means includes means for generating a first signal, said first signal generating means electrically connected to said clock-control means, said first and second switch means being responsive to said first signal, the frequency of said first signal being equal to at least one cycle of said power line frequency.

6. The system as claimed in claim 5 wherein said power line frequency is 60Hz and the frequency of said first signal is 61.4KHz.

7. The system as claimed in claim 5 wherein said phase lock oscillator means includes means for generating a second signal, said second signal generating means electrically connected to said clock-control means, the frequency of said second signal being a multiple of the frequency of said first signal.

8. A low level analog to digital conversion system powered by an alternating current, said system comprising:

a. sampling amplifier means, an analog signal applied to the input of said sampling amplifier means;

b. integrating converter means electrically connected to said sampling amplifier means for converting the analog signal as at the output of said sampling amplifier means to a digital signal; and c. means electrically connected to said converter means for controlling the conversion time of said converter means, the integration time of said converter means being at least one cycle of the power line frequency;

d. said sampling amplifier means including:

i. amplifier means having an input and output;

ii. first switch means, one side of said first switch means connected to the input of said amplifier means;

iii. second switch means; one side of said second switch means connected to the input of said amplifier means;

iv. capacitor means, one side of said capacitor means connected to the output of said amplifier means;

v. third switch means, one side of said third switch means connected to the other side of said capacitor means, the other side of said third switch means connected to the other side of said second switch means;

vi. said analog signal applied to the input of said amplifier means through said first switch means when said first switch means is energized;

vii. said capacitor means charged to the offset voltage of said amplifier means when said second and third switch means are energized;

viii. said second and third switch means having similar states, said first switch means and said second and third switch means having mutually exclusive states.

9. The system as claimed in claim 8 wherein said sampling amplifier means includes means for controlling the gain of said amplifier means.

10. The system as claimed in claim 9 including means for digitally specifying the gain of said amplifier means, said digital specifying means electrically connected to said means for controlling the gain of said amplifier means.

11. A low level analog to digital conversion system powered by an alternating current, said system comprising:

a. sampling amplifier means having input and output terminals, said input terminal adapted to receive an analog signal;

b. integrating converter means electrically connected to said sampling amplifier means for converting the analog signal at said output terminal of said sampling amplifier means to a digital signal;

c. clock means operatively connected to said converter means for controlling the conversion time of said converter means, the integration time of said converter means being an integral multiple of the power line frequency; and d. phase lock means operatively connected to said clock means, said phase lock means generating an output signal derived from the power line frequency, said output signal being independent of shifts in the power line frequency, said output signal operating to control said clock means.

* * * * *